United States Patent
Epshetsky et al.

(10) Patent No.: US 8,985,589 B1
(45) Date of Patent: Mar. 24, 2015

(54) SEAL ASSEMBLY WITH ADJUSTABLE OUTSIDE DIAMETER

(71) Applicants: Yefim Epshetsky, Schaumburg, IL (US); John Manuel Dominguez, Elgin, IL (US)

(72) Inventors: Yefim Epshetsky, Schaumburg, IL (US); John Manuel Dominguez, Elgin, IL (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/042,034

(22) Filed: Sep. 30, 2013

(51) Int. Cl.
*F16J 15/34* (2006.01)
*F16J 15/32* (2006.01)

(52) U.S. Cl.
CPC .................................. *F16J 15/3216* (2013.01)
USPC ............................ 277/578; 277/577; 277/551

(58) Field of Classification Search
USPC ......... 277/549, 551, 552, 553, 561, 572, 576, 277/577, 578
See application file for complete search history.

(56) References Cited

U.S. PATENT DOCUMENTS

| | | | | |
|---|---|---|---|---|
| 4,234,196 A | * | 11/1980 | Iida | 277/565 |
| 5,207,794 A | * | 5/1993 | Erdal | 277/346 |
| 8,505,925 B2 | * | 8/2013 | Gao et al. | 277/553 |
| 8,684,362 B2 | * | 4/2014 | Balsells et al. | 277/353 |
| 2011/0037234 A1 | * | 2/2011 | Balsells et al. | 277/562 |

* cited by examiner

*Primary Examiner* — Gilbert Lee
(74) *Attorney, Agent, or Firm* — Mark Ussai; SKF USA Inc. Patent Dept.

(57) ABSTRACT

A seal assembly for sealing a space between a shaft and a housing includes a seal having a central axis, an inner annular sealing lip sealingly engageable with the shaft and an outer annular rim with an outer circumferential surfaces engageable with the housing inner surface. At least one and preferably two support members are disposed within the annular rim and at least one and preferably a plurality of adjustment devices are coupled with the support members. Each adjustment device is configured to displace at least a portion of each support member radially outwardly with respect to the central axis, to displace at least a portion of the rim generally toward the housing inner surface, and/or to displace at least a portion of each support member radially inwardly toward the central axis to permit displacement of at least a portion of the rim generally away from the housing inner surface.

16 Claims, 8 Drawing Sheets

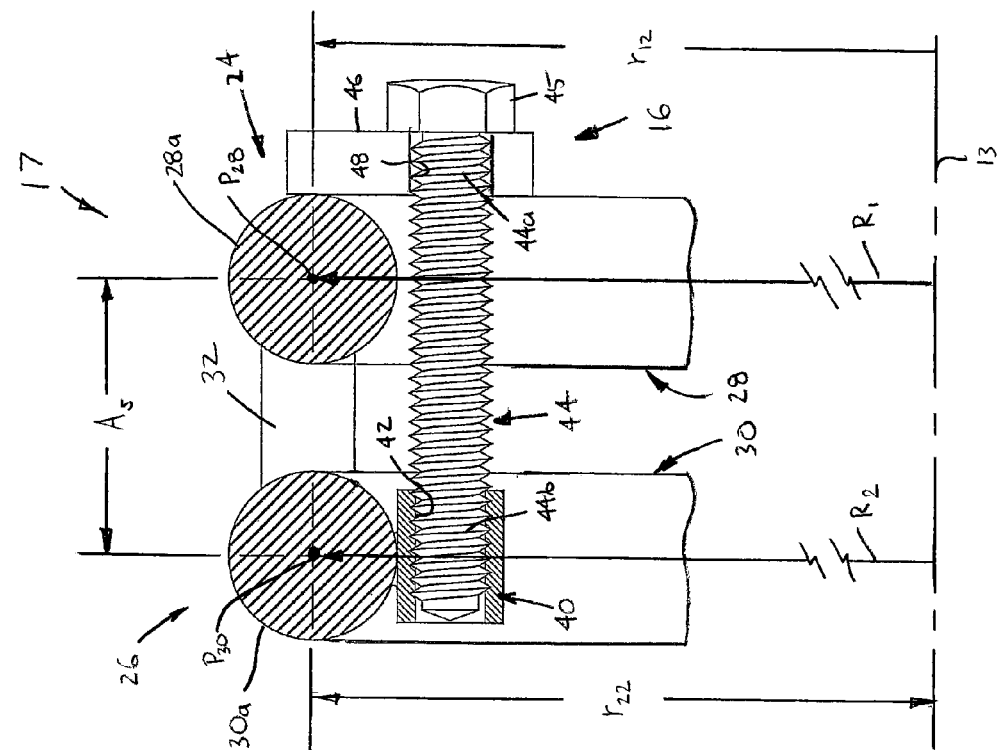
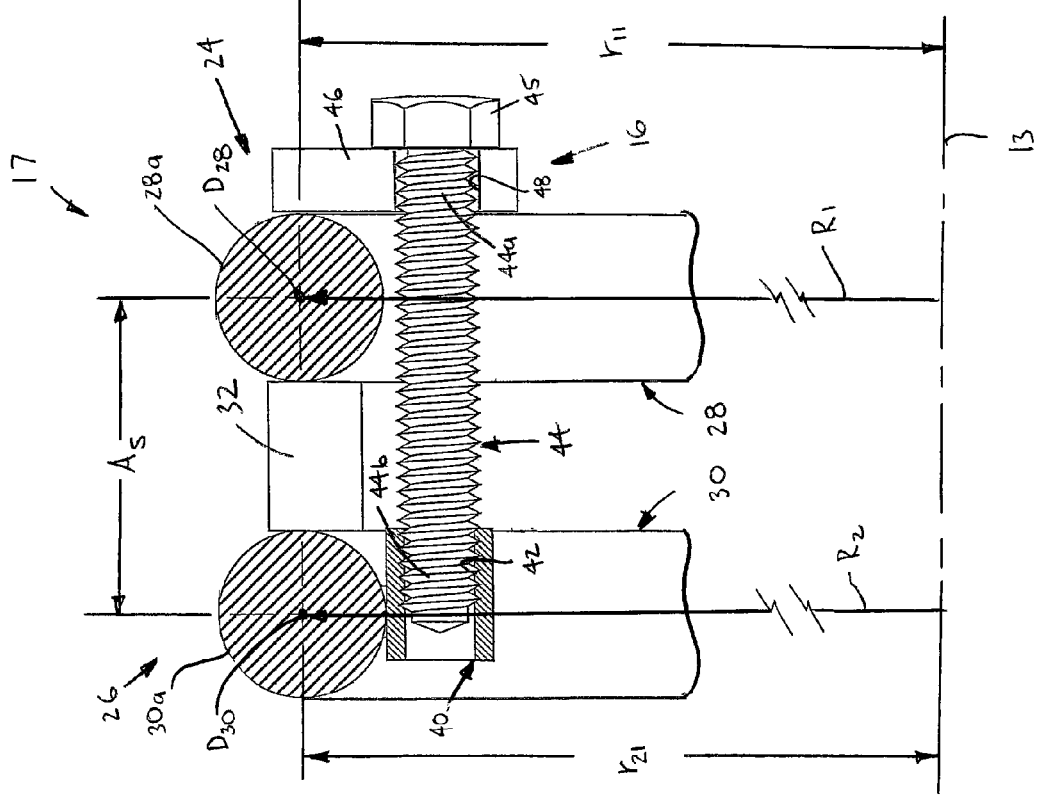

US 8,985,589 B1

SEAL ASSEMBLY WITH ADJUSTABLE OUTSIDE DIAMETER

BACKGROUND OF THE INVENTION

The present invention relates to seals, and more particularly to radial lip seals.

Radial lip seals are known and typically include and an annular elastomeric sealing member with a cantilever-like sealing lip and an annular case for coupling the sealing member to a housing. In many seal products, the case is a metallic member to which the separate sealing member is bonded or otherwise attached. To install such a seal within a housing, the outer circumferential surface of the metallic case slides against an inner circumferential surface of the housing until reaching a desired axial position relative to the shaft and housing.

In other types of seals, the case is an integral portion of the sealing member, such that the sealing member and casing are a one-piece elastomeric component. With such seals, the case is typically formed as a relatively thick elastomeric ring portion that is capable of resisting fluid pressure while remaining at a fixed axial position relative to a shaft and housing. Due to the substantially higher friction coefficient of elastomer and steel (as opposed to steel on steel) and the relatively large required thickness, installation of the seal assembly into the housing bore is relatively difficult and more likely to abrade or otherwise damage the elastomer.

SUMMARY OF THE INVENTION

In one aspect, the present invention is a seal assembly for sealing a space between a shaft and a housing having an inner circumferential surface. The seal assembly comprises a seal having a central axis, an inner annular sealing lip sealingly engageable with the shaft and an outer annular rim with an outer circumferential surface engageable with the housing inner surface. At least one support member is disposed within the annular rim and at least one adjustment device is coupled with the support member. The adjustment device is configured to displace at least a portion of the support member radially outwardly with respect to the central axis, so as to displace at least a portion of the rim generally toward the housing inner surface, or/and to displace at least a portion of the support member radially inwardly toward the central axis to permit displacement of at least a portion of the rim generally away from the housing inner surface.

In another aspect, the present invention is again a seal assembly for sealing a space between a shaft and a housing having an inner circumferential surface. The seal assembly comprises a seal having a central axis, an inner annular sealing lip sealingly engageable with the shaft and an outer annular rim with inner and outer circumferential surfaces, the rim outer circumferential surface being engageable with the housing inner surface. First and second support members are disposed within the annular rim, the two support members being axially spaced apart and each including a generally annular body engageable with the rim inner surface so as to retain the rim outer surface engaged with the housing inner surface. At least two spacers are disposed between the first and second support members and spaced circumferentially apart. Further, at least one adjustment device is disposed generally between the two spacers and is connected with a separate portion of each one of the first and second support members. The adjustment device is configured to displace each one of the connected support member portions generally axially such that the connected support member portions displace generally radially with respect to the central axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 5 is a view of FIG. 3 without the seal body;

FIG. 6 is a view of FIG. 4 without the seal body;

DETAILED DESCRIPTION OF THE INVENTION

Figure 1:
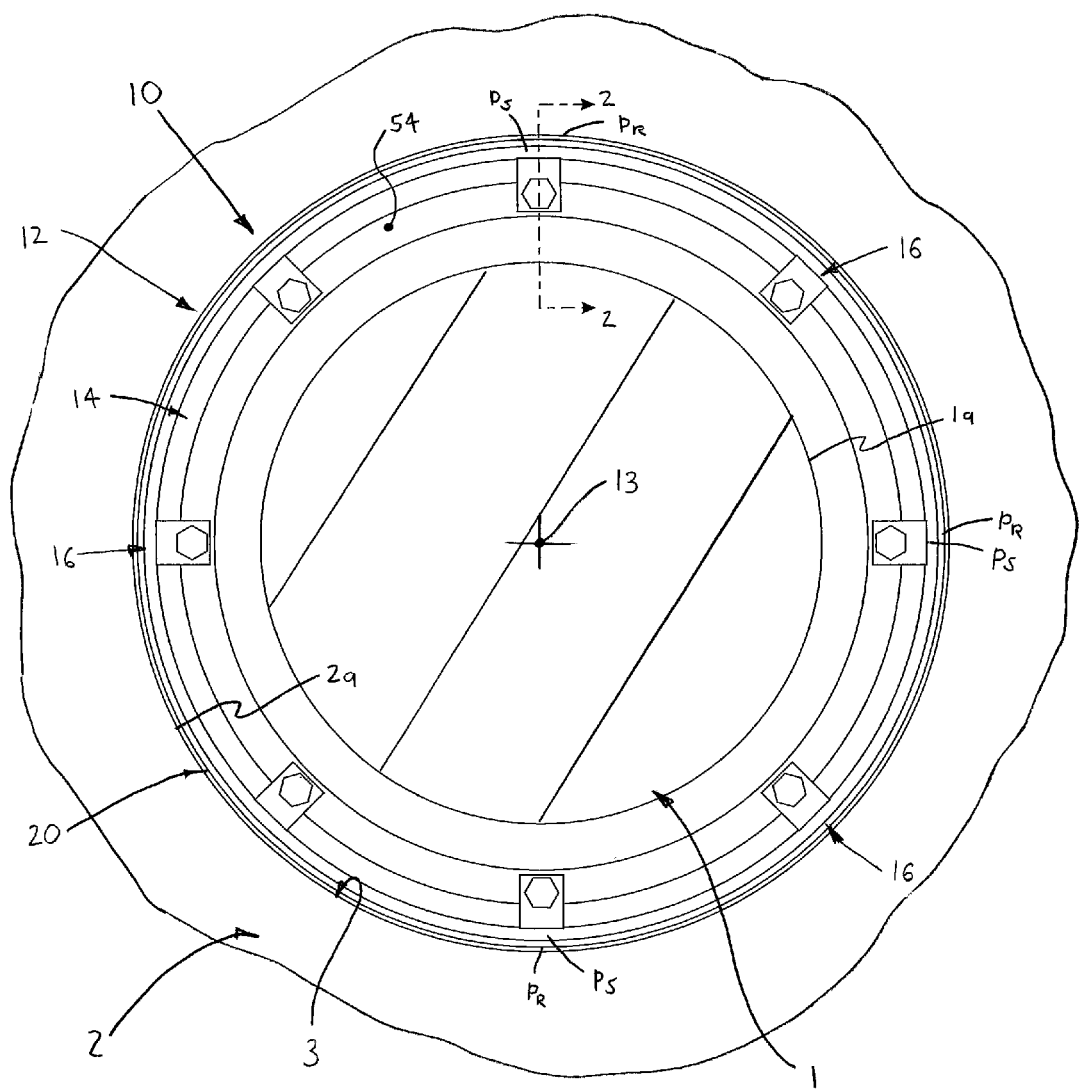
FIG. 1 is a front elevational view of a seal assembly in accordance with the present invention.

Certain terminology is used in the following description for convenience only and is not limiting. The words "inner", "inwardly" and "outer", "outwardly" refer to directions toward and away from, respectively, a designated central axis or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-12 a seal assembly 10 for sealing a space S (FIG. 2) between a shaft 1 and a housing 2, the housing 2 having an inner circumferential surface 2a defining a bore 3. The seal assembly 10 basically comprises a seal 12, at least one support member 14 disposed within the seal 12 and at least one adjustment device 16 configured to displace at least a portion of the support member 14 to adjust engagement of the seal 12 with the housing inner surface 2a. The seal 12 has a central axis 13, an inner annular sealing lip 18 sealingly engageable with the shaft 2 and an outer annular rim 20 with an inner circumferential surface 21 and an outer circumferential surface 22, the outer surface 22 being engageable with the housing inner surface 2a. The at least one support member 14 is disposed within the annular rim 20 and the at least one adjustment device 16 is coupled with the support member 14.

Further, the at least one adjustment device 16 is configured to displace at least a portion $p_S$ of the coupled support member 14 generally radially outwardly with respect to the central axis 13, so as to engage with and/or displace at least a portion $p_R$ of the rim 20 generally toward, and preferably into engagement with, the housing inner surface 2a to retain the seal assembly 10 at a fixed position within the housing 2. Additionally or alternatively, the adjustment device 16 is configured to displace at least a portion $p_S$ of the support member 14 radially inwardly toward the central axis 13, so as to disengage from and/or permit displacement of at least a portion $p_R$ of the rim 20 generally away from the housing inner surface 2a, thereby disengaging the rim 20 from the housing 2 and enabling removal of the seal assembly 10. The meaning of "disengaged from" the housing 1 as used herein means that the rim 20 does not exert pressure against the housing inner surface 2a, but may remain in contact with the housing surface 2a.

Preferably, the at least one support member 14 includes first and second support members 24, 26, each one of the support members 24, 26 including a generally annular body 28, 30, respectively. Each support member body 28, 30 is generally centered about the central axis 13 and is engageable with the rim inner surface 2a, the two support member bodies 28, 30 being spaced axially apart (i.e., along the axis 13). Further, each support member body 28, 30 is preferably a substantially circular hoop formed of metallic bar stock (e.g. steel) having circular axial cross-sections, but may alternatively be formed of a non-metallic material or/and having axial cross-sections of another appropriate shape (e.g., elliptical, hexagonal, square, etc.).

Furthermore, the at least one adjustment device 16 is connected with a separate portion 28a, 30a of each one of the first and second annular support member bodies 28, 30, the two member portions 28a, 30a being spaced by an axial distance $A_S$. The adjustment device 16 is configured to displace the connected first and second support member "movable" portions 28a, 30a generally axially such that these movable portions 28a, 30a also displace generally radially with respect to the central axis 13, thereby adjusting a first radial distance $R_1$ between the first member portion 28a and the central axis 13 and a second radial distance $R_2$ between the second member portion 30a and the central axis 13.

Specifically, as indicated in FIGS. 3-6, each of the first and second support member movable portions 28a, 30a is displaceable between a distal axial position $D_{28}$, $D_{30}$, respectively, and a proximal axial position $P_{28}$, $P_{30}$, respectively. The axial distance $A_S$ between the movable portions 28a, 30a has a first, greater value at the distal axial position $D_{28}$, $D_{30}$ and a second, lesser value $r_{11}$, $r_{21}$, respectively, at the proximal axial positions $P_{28}$, $P_{30}$, i.e., the portions 28a, 30a are closer together at the proximal positions $P_{28}$, $P_{30}$. Further, the first radial distance $R_1$ has a first, greater value $r_{11}$ at the first member portion distal position $D_{28}$ and a second, lesser value $r_{12}$ at the first member portion proximal position $P_{28}$, such that the portion 28a is closer to the axis 13 at the second position $P_{28}$. Likewise, the second radial distance $R_2$ has a first, greater value $r_{21}$ at the second member portion distal position $D_{30}$ and a second, lesser value $r_{22}$ at the second member portion proximal position $P_{30}$.

Preferably, the two support member bodies 28, 30 are substantially equally sized (i.e., same diameter and radial thickness), the two support member portion distal positions $D_{28}$, $D_{30}$ are at least generally equidistant from the central axis 13 and the two support member portion proximal positions $P_{28}$, $P_{30}$ are at least generally equidistant from the axis 13. In other words, the first value $r_{11}$ of the first radial distance $R_1$ is at least approximately equal to the first value $r_{21}$ of the second radial distance $R_2$ and the second value $r_{12}$ of the first radial distance $R_1$ is at least approximately equal to the second value $r_{22}$ of the second radial distance $R_2$.

Thus, the adjustment device 16 displaces each of the support member movable portions 28a, 30a between a radially outer, distal axial position $D_{28}$, $D_{30}$, at which the support members 28, 30 retain and/or exert pressure on the rim 20 to maintain engagement between the rim outer surface 20a and the housing inner surface 2a, and a radially-inner, proximal axial position $P_{28}$, $P_{30}$, at which the rim 20 is inwardly movable or bendable to enable installation or removal of the seal assembly 10 into or from the housing 2. The at least one adjustment device 16 is capable of displacing the connected support member portions 28a, 30a in the above-described manner due the structure of the adjustment device 16 and the relative arrangement of the device 16 and at least one pair of preferred spacers 32.

Specifically, the seal assembly 10 preferably further comprises at least two spacers 32 disposed between the first and second support member annular bodies 28, 30 and spaced apart circumferentially with respect to the central axis 13. The at least one adjustment device 16 is disposed generally centrally between the at least two spacers 32, such that axial displacement of the movable body portions 28a, 30a causes the support member bodies 28, 30 to bend or unbend about the spacers 32. That is, when the adjustment device 16 axially displaces each one of the first and second support member portions 28a, 30a generally axially toward the other one of the first and second support member portions 30a, 28a, each one of the first and second support members 24, 26 generally bends about each one of the two spacers 32. As the portions 28b, 30b of the two bodies 28, 30 contacting the two spacers 32 remain spaced apart, the relative axial displacement of the portions 28a, 30a between these body sections causes the first and second support member portions 28a, 30a to bend or displace generally radially inwardly since the total distance about each body 28, 30 (i.e., the circumference) remains substantially unchanged.

Alternatively, when the adjustment device 16 axially displaces each one of the first and second support member portions 28a, 30a generally axially away from the other one of the first and second support member portions 30a, 28a, each one of the two support member movable portions 28a, 30a displaces generally radially outwardly as the first and second support member bodies 28, 30 unbend about each one of the two spacers 32. That is, when the adjustment device 16 moves the support member portions 28a, 30a axially from the proximal positions $P_{28}$, $P_{30}$ toward the distal positions $D_{28}$, $D_{30}$, the sections of the support member bodies 28, 30 between the spacers 32 moves generally radially outwardly to return the non-bended or "flat" state, i.e., in which each support member body 28, 30 is substantially circular.

Most preferably, the seal assembly 10 includes a plurality of adjustment devices 16 and a plurality of spacers 32. Specifically, the plurality of spacers 32 are spaced circumferentially about the central axis 13 such that each two circumferentially adjacent spacers 32 defines a separate one of a plurality of pairs of spacers 32. The plurality of adjustment devices 16 are also spaced circumferentially about the central axis 13, with each one of the adjustment devices 16 being disposed between a separate one of the pairs of spacers 32. Each one of the adjustment devices 16 is independently operable to enable a separate portion $p_R$ of the rim 20 to be inwardly displaceable, and alternatively outwardly displaceable or at least radially retained, by the support member portions 28a, 30a proximal to the particular rim portion $p_R$.

Referring to FIGS. 2-7, each adjustment device 16 preferably includes a nut 40 with a threaded hole 42 coupled with the first support member portion 28a and a threaded rod 44 coupled with the second support member 30 and with the nut 40 so as to connect the first and second support members 28, 30. Specifically, the threaded rod 44 has a first end 44a rotatably coupled with the second support member portion 30a and a second end 44b threadably engaged with the threaded hole 42. Preferably, the adjustment device 16 also includes a coupler plate 46 attached to the second support member 30 and having a bearing hole 48, the rod 44 extending through the bearing hole 48 and having a head 45 disposeable against an outer surface 46a of the plate 46 so as to rotatably couple the rod 44 with the second support member body 30.

With this structure, when the support member portions 28a, 30 are located at the distal positions $D_{28}$, $D_{30}$, rotation of the rod 44 in a first angular direction (e.g., clockwise) displaces the first and second support member portions 28a, 30a generally axially toward each other (i.e., toward the proximal positions $P_{28}$, $P_{30}$) and generally radially inwardly toward the central axis 13. In other words, rotation of the threaded rod 44 in the first or clockwise direction $A_1$ advances the rod 44 through the nut 40, thereby pulling the two coupled support member portions 28a, 30a toward each other. Alternatively, when the member portions 28a, 30a are disposed at the proximal positions $P_{28}$, $P_{30}$, rotation of the rod 44 in a second, opposing angular direction (e.g., counter-clockwise) displaces the first and second support member portions 28a, 30a generally axially away from each other and generally radially outwardly from the central axis 13. That is, rotation of the threaded rod 44 in the second or counterclockwise direction $A_2$ withdraws the rod 44 from the nut 40, thereby pushing the two coupled support member portions 28a, 30a generally away from each other.

Although the seal assembly 10 is described and depicted as having two support members 14 and a plurality of adjustment devices 16 formed as a threaded rod and nut assembly, the support member(s) and/or the adjustment device(2) 16 may be formed in any appropriate manner. For example, the support member 14 may be formed as a single circular band having overlapping ends and a plurality of openings or notches, and the adjustment device 16 may be a single ratcheting type wheel that engages the support band notches so as to alternatively expand or contract the band to thereby vary the effective diameter and circumference (structure not shown). Further for example, the seal assembly 10 may include the two preferred support members 28, 30 and the plurality of spacers 32, but with the at least one adjustment device 16 formed as a turn buckle, a clamp, a ratcheting wheel and overlapping toothed plates or any other device capable of axially displacing portions of each support member 28, 30 generally axially (no alternative devices shown).

As yet another example, the at least one support member 14 may be provided by a plurality of hinged bracket plate assemblies connected with the seal body 50 (described below) and having one portion contactable with the rim inner surface 21, with a separate adjustment device 16 for each bracket, e.g., a pair of relatively slidable slotted arms and a rod and nut disposed in both slots and releasably coupling the two arms (structures not shown. The present invention encompasses these and all other alternative constructions of the support member(s) 14 and/or the adjustment device(s) 16 that enables the seal assembly 10 to function as generally described herein.

Figure 2:
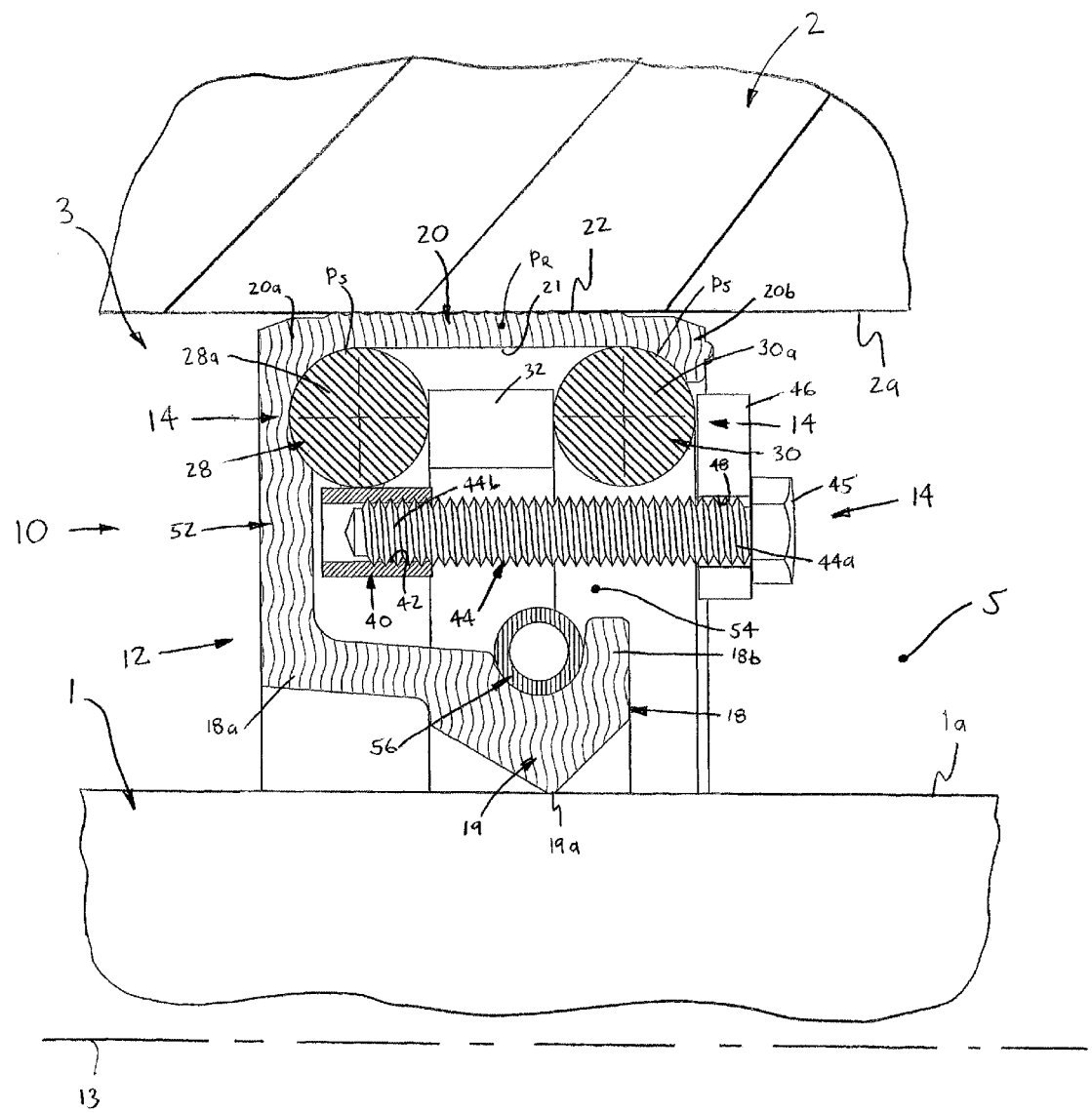
FIG. 2 is an axial cross-sectional view through line 2-2 of FIG. 1, showing two preferred support members at radially outward, distal axial positions and the seal assembly engaged with a housing bore and with a shaft.
Figure 4:
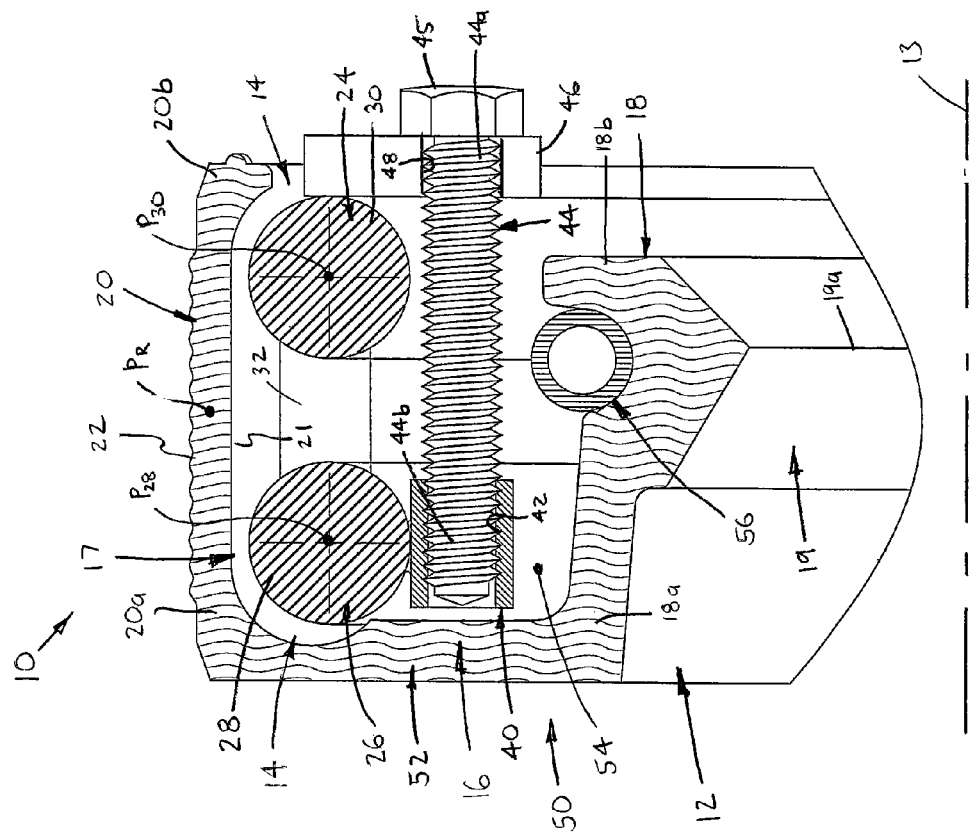
FIG. 4 is another view of FIG. 3, showing the two support members at radially inward, proximal axial positions.
Figure 3:
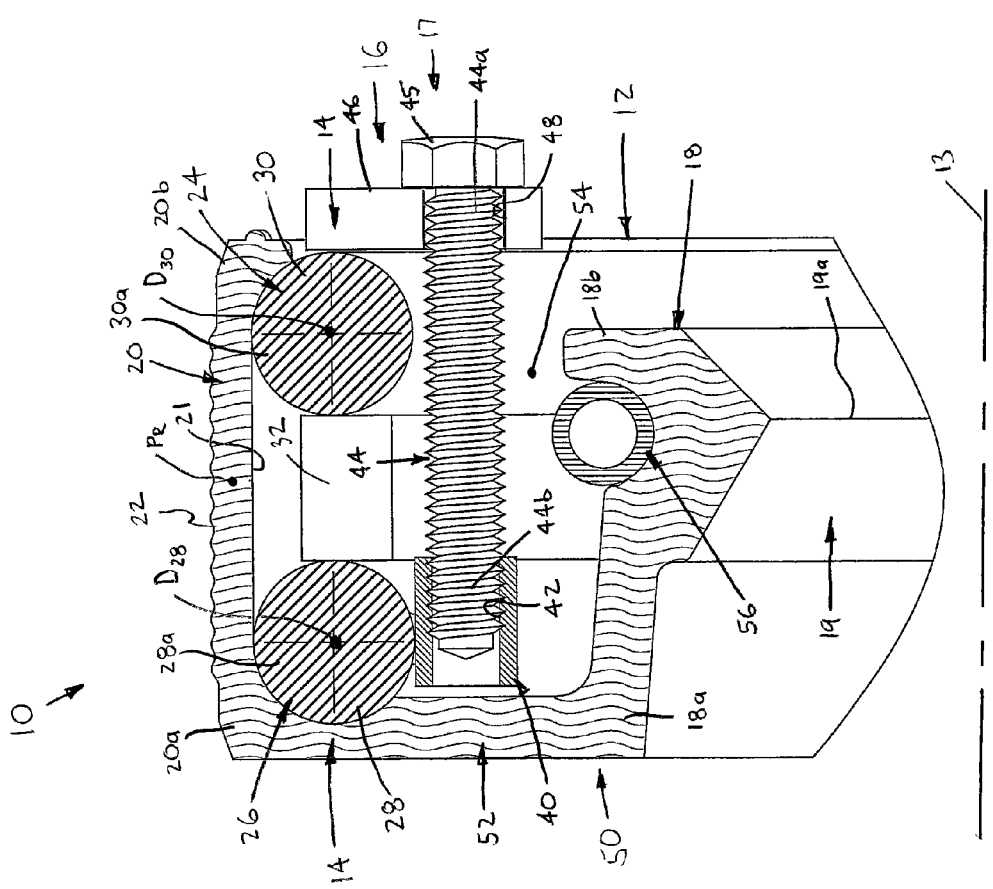
FIG. 3 is another view of FIG. 2, showing the seal assembly separate from the housing.
Figure 7:
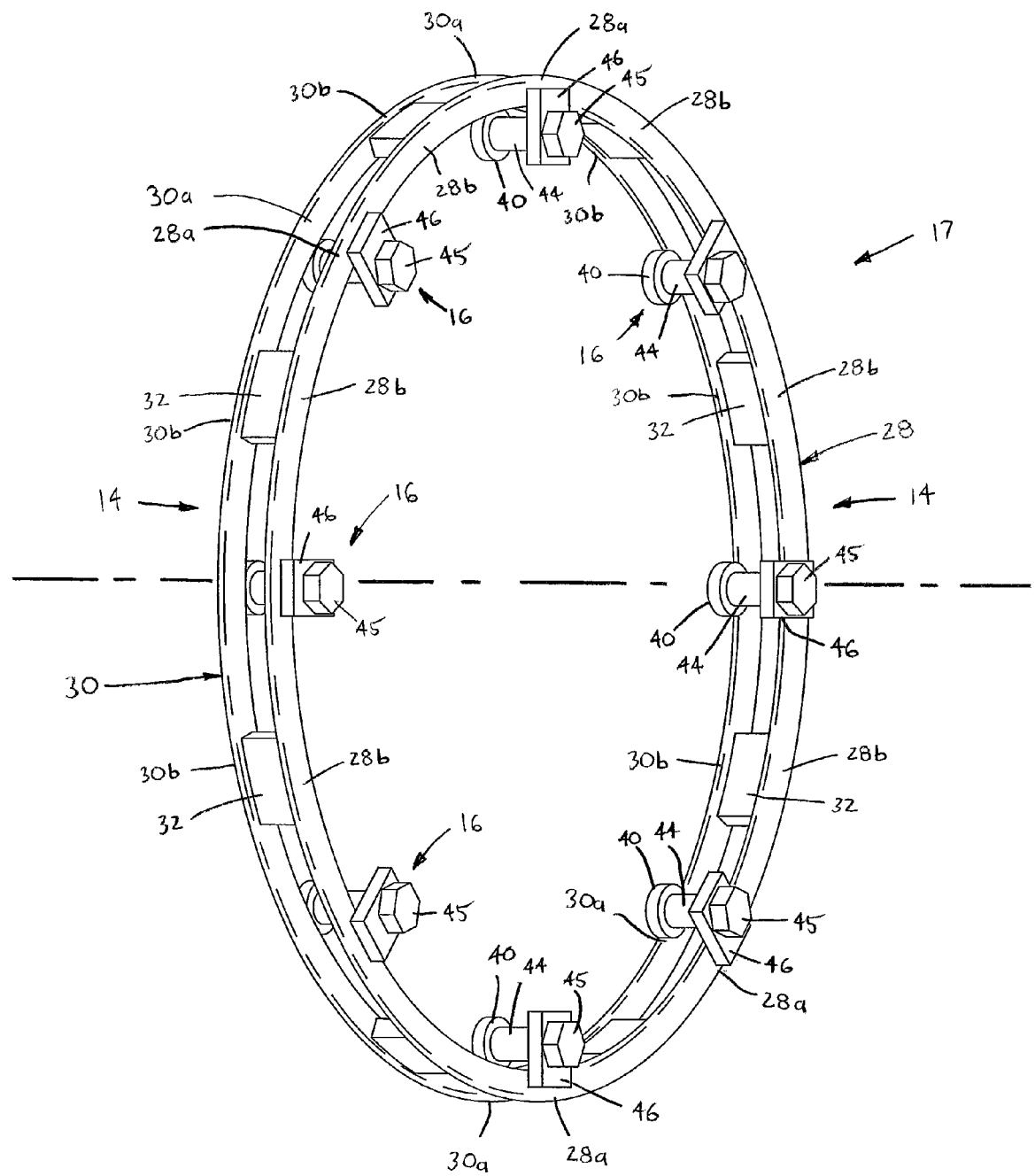
FIG. 7 is a perspective view of an adjustable support assembly including the two support members, a plurality of spacers and a plurality of spacers.
Figure 8:
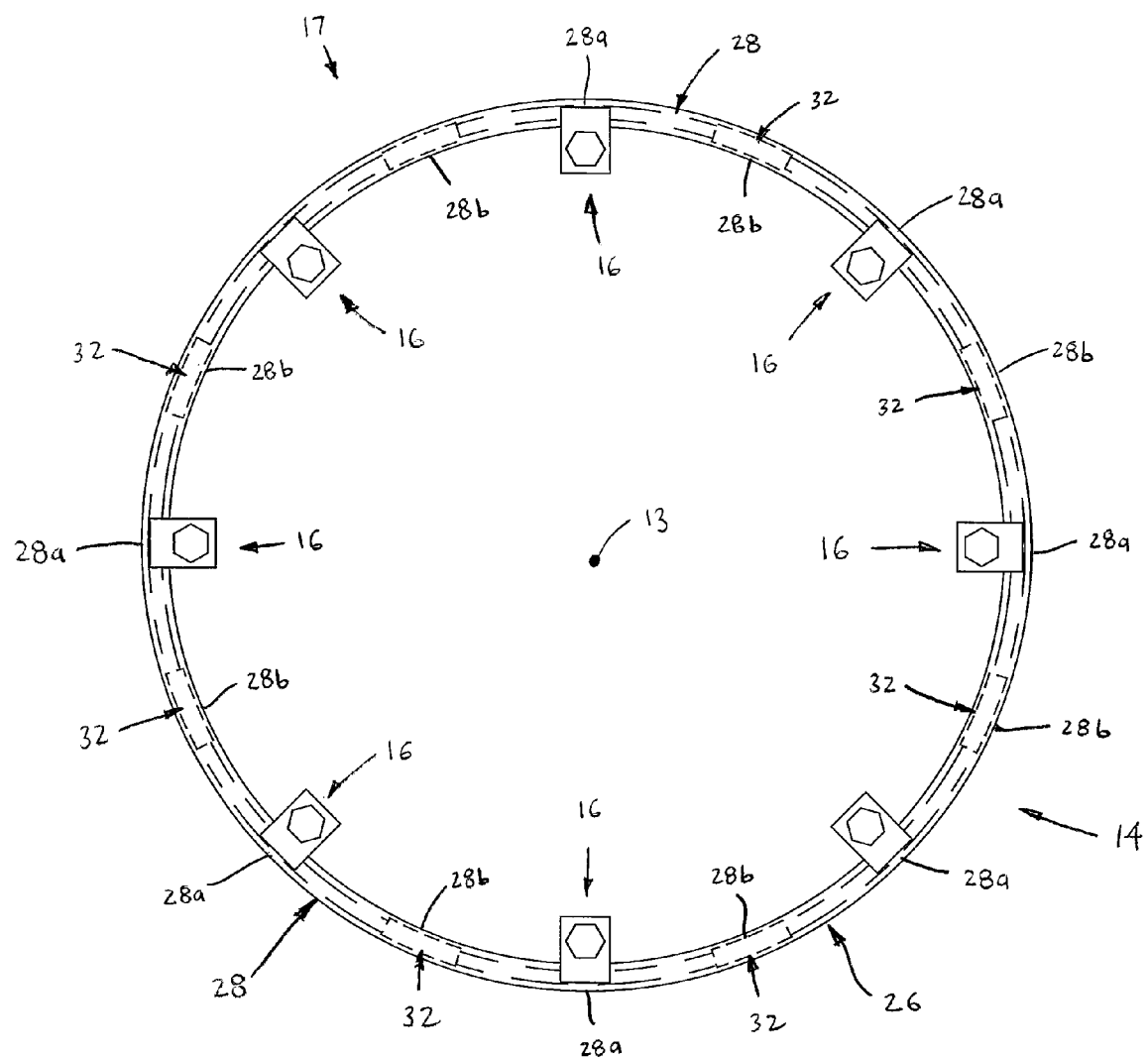
FIG. 8 is a front elevational view of the support members and adjustment devices of the seal assembly.
Figure 9:
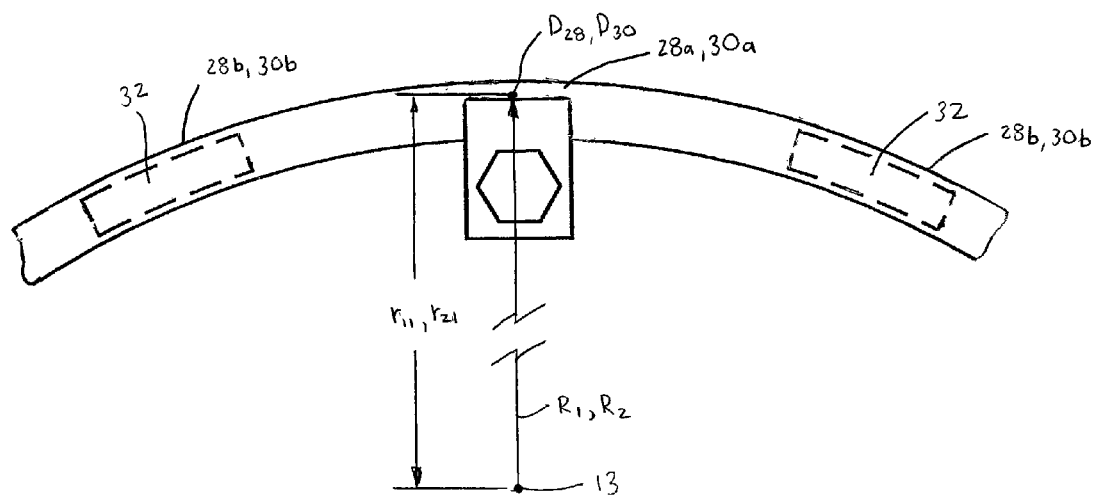
FIG. 9 is an enlarged, broken-away view of a portion of FIG. 8, showing portions of the support members at radially outward, distal axial positions.
Figure 10:
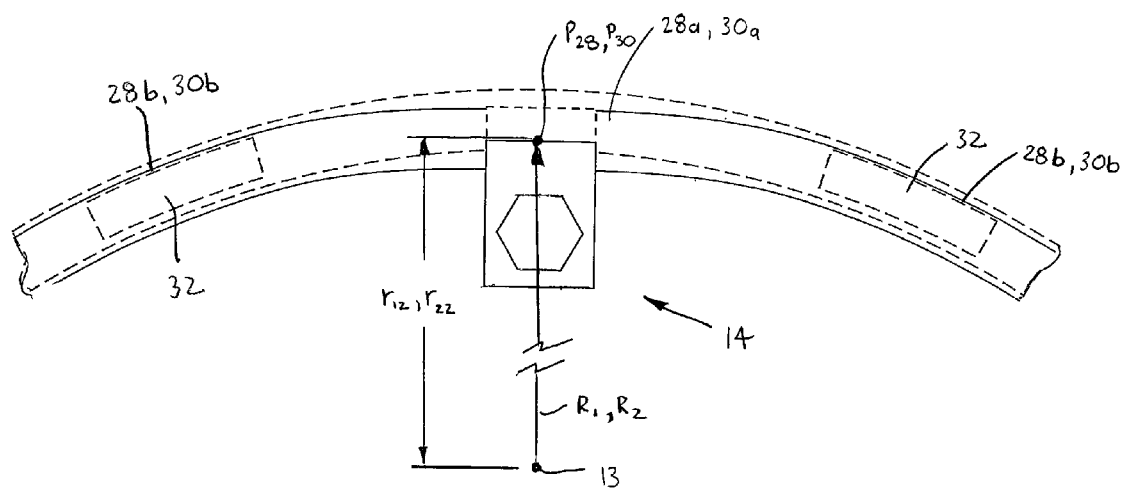
FIG. 10 is another enlarged, broken-away view of a portion of FIG. 8, showing the support member portions at radially inward, proximal axial positions.
Figure 11:
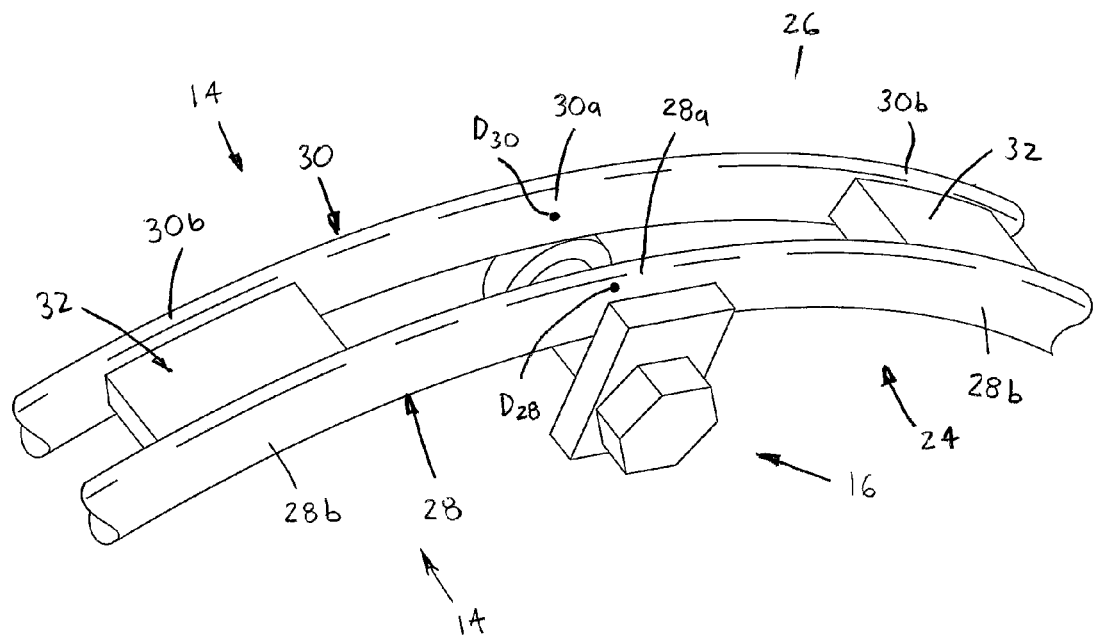
FIG. 11 is a perspective view of FIG. 9.
Figure 12:
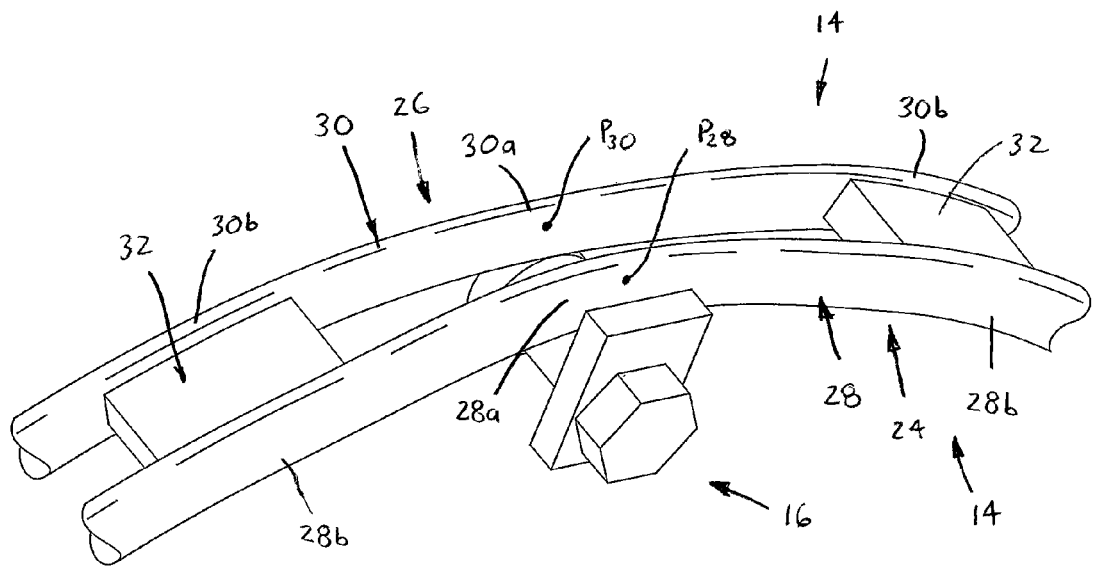
FIG. 12 is a perspective view of FIG. 10.

Referring now to FIGS. 2-4, the seal 12 preferably includes a generally annular elastomeric body 50 with a radially-inner portion 50a providing the lip 18 and a radially-outer portion 50a providing the rim 20. The seal body 50 further includes a central portion 52 extending generally radially between and integrally connecting the lip 18 and the rim 20. Preferably, the central portion 52 extends between generally aligned axial ends 18a, 20a of the lip 18 and the rim 20, such that the sealing lip 18, the central portion 50 and the rim 20 define a generally annular cavity 54. With this structure, the at least one and preferably two support members 14 are preferably disposed within the cavity 54.

Further, the lip 18 extends generally axially from a fixed end 18a integrally formed with an inner end of the central portion 52 to a free end 18b, and has a contact portion 19 formed adjacent to the free end 18b. The contact section 19 has generally triangular axial cross-sections and an inner circumferential edge surface 19a engageable with the shaft outer surface 1a, the lip 18 being at least partially pivotable about the fixed inner end 19a. Preferably, an annular biasing member 56, most preferably a garter spring, is disposed about the lip 18 to maintain contact between the sealing surface 19a and the shaft outer surface 1a.

Furthermore, the rim 20 is preferably generally tubular and extends from a fixed axial end 20a connected with the central portion 52 to a free axial end 20b, so as to extend axially from the central portion 52 generally in the manner of a cantilever. As such, radial outward displacement of the support members 28, 30 bends or pivots the rim 20 generally about the fixed end or/and compresses or squeezes the rim 20 between the support members 24, 26 and the housing inner surface 2a. That is, when the support member movable portions 28a, 30 are located at the distal axial positions $D_{28}$, $D_{30}$, the support members 24, 26 exert pressure radially outwardly on the annular rim 20 to maintain contact with the housing inner surface 2a, and alternatively release this pressure on the rim 20 when displaced toward the proximal axial positions $P_{28}$, $P_{30}$. Thus, with such a thin-walled rim 20, the support members 28, 30 provide the necessary rigidity to both retain the seal 10 axially in place as well as providing sufficient sealing force between the rim 20 and the housing 2.

Referring to FIGS. 1 and 2, the preferred seal assembly 10 is installed in the housing 2 in the following manner. First, if the support members 28, 30 are in the "nonbended" state, i.e., the support member movable portions 28a, 30a are located at the distal axial positions $D_{28}$, $D_{30}$, each of the one or more adjustment devices 16 are operated to displace the coupled support members portions radially inwardly to the proximal axial positions $P_{28}$, $P_{30}$. As discussed above, such movement of releases radial outward pressure on the rim 20 and/or enables radial inward displacement of the rim 20 at sections of the rim 20 proximal to the movable support member portions 28a, 30a. The seal assembly 10 may then be installed by inserting the assembly 10 into the housing bore 3 and then locating the seal 12 at a desired axial position within the housing 2. Once so positioned, each one of the adjustment devices 16 may then be operated to the displace the coupled support member portions 28a, 30a radially outwardly toward the distal positions $D_{28}$, $D_{30}$, thereby exerting pressure and/or displacing the rim 20 outwardly into engagement with the housing inner surface 2a. The seal assembly 10 is thereafter secured within the housing 2 until removal from the housing 2 is desired.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A seal assembly for sealing a space between a shaft and a housing having an inner circumferential surface, the seal assembly comprising:
   a seal having a central axis, an inner annular sealing lip sealingly engageable with the shaft and an outer annular rim with an outer circumferential surface engageable with the housing inner surface;
   at least one support member disposed within the annular rim; and
   at least one adjustment device coupled with the support member and configured to at least one of displace at least a portion of the support member radially outwardly with respect to the central axis to displace at least a portion of the rim generally toward the housing inner surface and displace at least a portion of the support member radially inwardly toward the central axis to permit displacement of at least a portion of the rim generally away from the housing inner surface;
   wherein the seal rim has an inner circumferential surface extending about the central axis, the at least one support member includes first and second support members, each one of the support members including a generally annular body generally centered about the central axis and engageable with the rim inner surface, the two support member bodies being spaced axially apart, and the at least one adjustment device is connected with a separate portion of each one of the first and second annular support member bodies and is configured to displace the connected first and second member body portions generally axially such that the connected body portions displace generally radially with respect to the central axis.

2. The seal assembly as recited in claim 1 further comprising at least two spacers disposed between the first and second support member annular bodies and spaced apart circumferentially with respect to the central axis, the at least one adjustment device being disposed generally between the at least two spacers such that:
   when the adjustment device axially displaces each one of the first and second support member portions generally axially toward the other one of the first and second support member portions, each one of the first and second support members generally bends about each one of the two spacers so as to displace the first and second support member portions generally radially inwardly; and
   when the adjustment device axially displaces each one of the first and second support member portions generally axially away from the other one of the first and second support member portions, each one of the first and second support member portions displaces generally radially outwardly as the first and second support members unbend about each one of the two spacers.

3. The seal assembly as recited in claim 2 wherein:
   the at least two spacers includes a plurality of spacers spaced circumferentially about the central axis such that each two circumferentially adjacent spacers defines a separate one of a plurality of pairs of spacers; and
   the at least one adjustment device includes a plurality of adjustment devices spaced circumferentially about the central axis, each one of the adjustment devices being disposed between a separate one of the pairs of spacers.

4. The seal assembly as recited in claim 1 wherein the at least one adjustment device includes:
   one of a threaded hole formed in the first support member portion and a nut with a threaded hole coupled with the first support member portion; and
   a threaded rod having a first end rotatably coupled with the second support member portion and a second end threadably engaged with the one threaded hole such that rotation of the rod in a first angular direction displaces the first and second support member portions generally axially toward each other and generally radially inwardly toward the central axis and rotation of the rod in a second, opposing angular direction displaces the first and second support member portions generally axially away from each other and generally radially outwardly from the central axis.

5. A seal assembly for sealing a space between a shaft and a housing having an inner circumferential surface, the seal assembly comprising:
   a seal having a central axis, an inner annular sealing lip sealingly engageable with the shaft and an outer annular rim with an outer circumferential surface engageable with the housing inner surface;
   at least one support member disposed within the annular rim; and
   at least one adjustment device coupled with the support member and configured to at least one of displace at least a portion of the support member radially outwardly with respect to the central axis to displace at least a portion of the rim generally toward the housing inner surface and displace at least a portion of the support member radially inwardly toward the central axis to permit displacement of at least a portion of the rim generally away from the housing inner surface;
   wherein the at least one support member includes first and second support members, each one of the support members including a generally annular body generally centered about the central axis and engageable with the rim inner surface, the two support member bodies being spaced axially apart; and
   wherein the at least one adjustment device is connected with a separate portion of each one of the first and second support member bodies and is configured to displace the connected first and second member portions generally axially so as to adjust a first radial distance between the first member portion and the central axis and a second radial distance between the second member portion and the central axis.

6. The seal assembly as recited in claim 5 wherein each adjustment device is configured to displace each one of the connected first and second space member portions generally axially toward the other one of the two spacer member portions so as to decrease the first and second radial distances and to alternatively displace each one of the connected first and second spacer member portions generally axially away from the other member portion so as to increase the first and second radial distances.

7. The seal assembly as recited in claim 5 wherein:
   the first and second support member portions are spaced by an axial distance and are each displaceable between distal and proximal axial positions, the axial distance having a first value at the distal axial position and a second value at the proximal axial position, the first value being greater than the second value; and the first radial distance has a first value at the first member portion distal position and a second value at the first member portion proximal position, the first radial distance first value being greater than the first radial distance second value, and the second radial distance has a first value at the second member portion distal position and a second value at the second member portion proximal position, the second radial distance first value being greater than the second radial distance second value, the first radial distance first value being approximately equal to the second radial distance first value and the first radial distance second value being approximately equal to the second radial distance second value.

8. The seal assembly as recited in claim 5 wherein the seal includes a generally annular elastomeric body with a radially-outer portion providing the rim and a radially-inner portion providing the lip.

9. The seal assembly as recited in claim 8 wherein the seal body includes a central portion extending generally radially between and integrally connecting the rim and the sealing lip, the rim, the central portion and the lip defining a generally annular cavity, the at least one support member being disposed within the cavity.

10. A seal assembly for sealing a space between a shaft and a housing having an inner circumferential surface, the seal assembly comprising:
    a seal having a central axis, an inner annular sealing lip sealingly engageable with the shaft and an outer annular rim with inner and outer circumferential surfaces, the rim outer circumferential surface being engageable with the housing inner surface;
    first and second support members disposed within the annular rim, the two support members being axially spaced apart and each including a generally annular body engageable with the rim inner surface so as to retain the rim outer surface engaged with the housing inner surface;
    at least two spacers disposed between the first and second support members and spaced circumferentially apart; and
    at least one adjustment device disposed generally between the two spacers, connected with a separate portion of each one of the first and second support members and configured to displace each one of the connected support member portions generally axially such that the connected support member portions displace generally radially with respect to the central axis;
    wherein the adjustment device is configured to displace each one of the first and second support member portions generally axially toward the other one of the first and second support member portions such that each one of the first and second support members generally bends about each one of the two spacers so as to displace the two support member portions generally radially inwardly and to alternatively displace each one of the first and second support member portions generally axially away from the other one of the first and second support member portions such that the two support member portions displace generally radially outwardly as each one of the first and second support members unbends about each one of the two spacers.

11. The seal assembly as recited in claim 10 wherein the seal includes a generally annular elastomeric body with a radially outer portion providing the rim and a radially inner portion providing the lip.

12. The seal assembly as recited in claim 10 wherein the seal body includes a central portion extending generally radially between and integrally connecting the rim and the sealing lip, the rim, the central portion and the lip defining a generally annular cavity, the first and second support members being disposed within the cavity.

13. A seal assembly for sealing a space between a shaft and a housing having an inner circumferential surface, the seal assembly comprising:
    a seal having a central axis, an inner annular sealing lip sealingly engageable with the shaft and an outer annular rim with inner and outer circumferential surfaces, the rim outer circumferential surface being engageable with the housing inner surface;
    first and second support members disposed within the annular rim, the two support members being axially spaced apart and each including a generally annular body engageable with the rim inner surface so as to retain the rim outer surface engaged with the housing inner surface;
    at least two spacers disposed between the first and second support members and spaced circumferentially apart; and
    at least one adjustment device disposed generally between the two spacers, connected with a separate portion of each one of the first and second support members and configured to displace each one of the connected support member portions generally axially such that the connected support member portions displace generally radially with respect to the central axis;
    wherein the at least two spacers includes a plurality of spacers spaced circumferentially about the central axis such that each two circumferentially adjacent spacers defines a separate one of a plurality of pairs of spacers; and
    wherein the at least one adjustment device includes a plurality of adjustment members spaced circumferentially about the central axis, each adjustment device being disposed between a separate one of the pairs of spacers.

14. A seal assembly for sealing a space between a shaft and a housing having an inner circumferential surface, the seal assembly comprising:
    a seal having a central axis, an inner annular sealing lip sealingly engageable with the shaft and an outer annular rim with inner and outer circumferential surfaces, the rim outer circumferential surface being engageable with the housing inner surface;
    first and second support members disposed within the annular rim, the two support members being axially spaced apart and each including a generally annular body engageable with the rim inner surface so as to retain the rim outer surface engaged with the housing inner surface;
    at least two spacers disposed between the first and second support members and spaced circumferentially apart; and
    at least one adjustment device disposed generally between the two spacers, connected with a separate portion of each one of the first and second support members and configured to displace each one of the connected support member portions generally axially such that the connected support member portions displace generally radially with respect to the central axis;
    wherein the at least one adjustment device includes:
        one of a threaded hole formed in the first support member portion and a nut with a threaded hole coupled with the first support member portion; and a threaded rod having a first end rotatably coupled with the second support member and a second end threadably engaged with the one threaded hole such that rotation of the rod in a first angular direction displaces the first and second support member portions generally axially toward each other and generally radially inwardly toward the central axis and rotation of the rod in a second, opposing angular direction displaces the first and second support member portions generally axially away from each other and generally radially outwardly from the central axis.

15. A seal assembly for sealing a space between a shaft and a housing having an inner circumferential surface, the seal assembly comprising:
  a seal having a central axis, an inner annular sealing lip sealingly engageable with the shaft and an outer annular rim with inner and outer circumferential surfaces, the rim outer circumferential surface being engageable with the housing inner surface;
  first and second support members disposed within the annular rim, the two support members being axially spaced apart and each including a generally annular body engageable with the rim inner surface so as to retain the rim outer surface engaged with the housing inner surface;
  at least two spacers disposed between the first and second support members and spaced circumferentially apart; and
  at least one adjustment device disposed generally between the two spacers, connected with a separate portion of each one of the first and second support members and configured to displace each one of the connected support member portions generally axially such that the connected support member portions displace generally radially with respect to the central axis;
  wherein the first and second support member portions are spaced by an axial distance and are each displaceable between distal and proximal axial positions, the axial distance having a first value at the distal axial position and a second value at the proximal axial position, the first value being greater than the second value; and
  wherein the first support member portion is spaced from the central axis by a first radial distance and the second support member portion is spaced from the central axis by a second radial distance, the first radial distance having a first value at the first member portion distal position and a second value at the first member portion proximal position, the first radial distance first value being greater than the first radial distance second value, and the second radial distance having a first value at the second member portion distal position and a second value at the second member portion proximal position, the second radial distance first value being greater than the second radial distance second value, the first radial distance first value being approximately equal to the second radial distance first value and the first radial distance second value being approximately equal to the second radial distance second value.

16. A seal assembly for sealing a space between a shaft and a housing having an inner circumferential surface, the seal assembly comprising:
  a seal having a central axis, an inner annular sealing lip sealingly engageable with the shaft and an outer annular rim with inner and outer circumferential surfaces, the rim outer circumferential surface being engageable with the housing inner surface;
  first and second support members disposed within the annular rim, the two support members being axially spaced apart and each including a generally annular body engageable with the rim inner surface so as to retain the rim outer surface engaged with the housing inner surface;
  at least two spacers disposed between the first and second support members and spaced circumferentially apart; and
  at least one adjustment device disposed generally between the two spacers, connected with a separate portion of each one of the first and second support members and configured to displace each one of the connected support member portions generally axially such that the connected support member portions displace generally radially with respect to the central axis;
  wherein each adjustment device is configured to displace each one of the connected first and second support member portions generally axially toward the other one of the two support member portions so as to decrease the first and second radial distances and to alternatively displace each one of the connected first and second spacer member portions generally axially away from the other member portion so as to increase the first and second radial distances.

* * * * *